United States Patent
Akiyama et al.

(10) Patent No.: US 6,636,970 B2
(45) Date of Patent: *Oct. 21, 2003

(54) SOFTWARE ENCODING USING A COMBINATION OF TWO TYPES OF ENCODING AND ENCODING TYPE IDENTIFICATION INFORMATION

(75) Inventors: Ryota Akiyama, Kawasaki (JP); Makoto Yoshioka, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/597,916

(22) Filed: Feb. 7, 1996

(65) Prior Publication Data
US 2003/0084310 A1 May 1, 2003

(30) Foreign Application Priority Data
Feb. 14, 1995 (JP) ............................................. 7-025707

(51) Int. Cl.[7] ............................... H04L 9/32; H04L 9/00
(52) U.S. Cl. ......................................... 713/189; 380/28
(58) Field of Search .............................. 380/21, 49, 59, 380/4, 3, 262, 269, 280; 713/150, 166; 706/13

(56) References Cited

U.S. PATENT DOCUMENTS

| | | | | |
|---|---|---|---|---|
| 3,962,539 A | * | 6/1976 | Ehrsam et al. | 380/29 |
| 4,247,106 A | | 1/1981 | Jeffers et al. | 273/85 |
| 4,405,829 A | * | 9/1983 | Rivest et al. | 380/30 |
| 4,439,670 A | | 3/1984 | Basset et al. | |
| 4,441,095 A | * | 4/1984 | Widmer et al. | 380/28 |
| 4,446,519 A | | 5/1984 | Thomas | |
| 4,484,025 A | * | 11/1984 | Ostermann et al. | 380/21 |
| 4,484,217 A | | 11/1984 | Block et al. | |
| 4,558,176 A | | 12/1985 | Arnold et al. | 380/4 |
| 4,590,557 A | | 5/1986 | Lillie | |
| 4,598,170 A | | 7/1986 | Piosenka et al. | 380/4 |
| 4,646,234 A | | 2/1987 | Tolman et al. | 380/4 X |
| 4,649,510 A | | 3/1987 | Schmidt | |
| 4,652,990 A | | 3/1987 | Pailen et al. | 380/4 |
| 4,654,799 A | | 3/1987 | Ogaki et al. | |
| 4,658,093 A | | 4/1987 | Hellman | 380/25 |

(List continued on next page.)

FOREIGN PATENT DOCUMENTS

JP    60-169959    9/1985

OTHER PUBLICATIONS

Bruce Schneier(Applied Cryptography, second edition book, pp. 346–354), Oct. 1995.*
G. S. Vernam, Cipher Printing Telegraph Systems, American Institute of Electrical Engineers, vol. XLV, No. 2, Feb. 26.*
Handbook of Applied Crypotography, Menezes, pp. 240–241, CRC Press, 1996.*
Schneier, Applied Cryptography, 2e, Feb. 26.*

(List continued on next page.)

Primary Examiner—Gail Hayes
Assistant Examiner—HoSuk Song
(74) Attorney, Agent, or Firm—Staas & Halsey LLP (57) ABSTRACT

When encoding software, two or more encoding algorithms are employed. Conversely, for software decoding processing, decoding algorithms are prepared that correspond to these two or more encoding algorithms. Then, in software encoding processing, encoded algorithm combination identification information is transferred to the software decoding processing along with the encoded software. During software decoding processing, opposite algorithms possessed by the decoding means are selected based on the previously mentioned algorithm combination identification information, and the previously mentioned encoded software is decoded.

20 Claims, 10 Drawing Sheets

U.S. PATENT DOCUMENTS

| | | | |
|---|---|---|---|
| 4,672,554 A | | 6/1987 | Ogaki |
| 4,674,055 A | | 6/1987 | Ogaki et al. |
| 4,740,890 A | | 4/1988 | William |
| 4,771,458 A | * | 9/1988 | Citta et al. .................... 380/20 |
| 4,780,905 A | | 10/1988 | Cruts et al. |
| 4,787,050 A | | 11/1988 | Suzuki |
| 4,816,653 A | | 3/1989 | Anderl et al. |
| 4,816,654 A | | 3/1989 | Anderl et al. |
| 4,817,140 A | | 3/1989 | Chandra et al. |
| 4,817,144 A | * | 3/1989 | Citta et al. .................... 380/20 |
| 4,853,962 A | * | 8/1989 | Brockman .................. 380/44 |
| 4,864,516 A | | 9/1989 | Gaither et al. |
| 4,879,645 A | | 11/1989 | Tamada et al. |
| 4,949,257 A | | 8/1990 | Orbach |
| 4,999,806 A | | 3/1991 | Chernow et al. |
| 5,006,849 A | | 4/1991 | Baarman et al. |
| 5,008,814 A | | 4/1991 | Mathur |
| 5,014,234 A | | 5/1991 | Edwards, Jr. |
| 5,016,009 A | | 5/1991 | Whiting et al. |
| 5,051,822 A | | 9/1991 | Rhoades |
| 5,056,009 A | | 10/1991 | Mizuta |
| 5,103,392 A | | 4/1992 | Mori |
| 5,103,476 A | | 4/1992 | Waite et al. |
| 5,166,886 A | | 11/1992 | Molnar et al. |
| 5,179,591 A | * | 1/1993 | Hardy et al. .................. 380/21 |
| 5,181,107 A | | 1/1993 | Rhoades |
| 5,185,796 A | * | 2/1993 | Wilson ........................ 380/21 |
| 5,199,066 A | | 3/1993 | Logan |
| 5,199,069 A | * | 3/1993 | Barrett et al. ................ 380/28 |
| 5,214,697 A | | 5/1993 | Saito |
| 5,222,134 A | | 6/1993 | Waite et al. |
| 5,237,611 A | * | 8/1993 | Rasmussen et al. ........ 380/284 |
| 5,239,581 A | * | 8/1993 | Hane ............................ 380/3 |
| 5,245,330 A | | 9/1993 | Wassink |
| 5,267,171 A | | 11/1993 | Suzuki et al. |
| 5,301,231 A | * | 4/1994 | Abraham et al. ........... 713/191 |
| 5,311,595 A | | 5/1994 | Bjerrum et al. .............. 380/25 |
| 5,343,527 A | | 8/1994 | Moore ......................... 713/179 |
| 5,343,530 A | | 8/1994 | Viricel ......................... 380/23 |
| 5,479,512 A | * | 12/1995 | Weiss .......................... 380/28 |
| 5,673,320 A | * | 9/1997 | Ray et al. .................... 713/176 |

OTHER PUBLICATIONS

Menezes, Handbook of Applied Cryptography p. 57, 1997.*

C. E. Shannon, Communication Theory of Secrecy Systems, Jan. 9, 1945.*

Sandra Botemps, Letter from John Wiley, date of Publication of Schneier Applied Cryptography, 1997.*

Caxton Foster, Cryptanalysis for Microcomputers, 1982, Hayden Book Company, pp. 222–223.*

Copy of the claims section of the corresponding European Patent (EP 0 727 746, May 15, 2002) of the above–identified US patent application.

Office Action issued by the Korean Patent Office in the corresponding Korean Patent Application No. 10–2000–0032044 of the above–identified application, Jun. 7, 2001, including English language translation of the Office Action.

Office Action issued by the Patent Office of the People's Republic of China in the corresponding Chinese Patent Application No. 96102014.8 of the above–identified application, Mar. 3, 2000, including English language translation of the Office Action.

Office Action from the Korean Patent Office in a corresponding foreign application, mailed Nov. 30, 2000 and Abridged English translation thereof.

Korean Office Action dated Feb. 24, 1999 regarding Application No. 10–1996–0003295 to Fujitsu Kabushiki Kaisha (translation also enclosed).

Japanese Patent Laid–Open Publication No. 57–127249, Aug. 7, 1982 (equivalent to Japanese Patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

Office Action issued by the Korean Patent Office in the corresponding Korean Patent Application No. 10–2000–0032044 of the above–identified application, Dec. 15, 2001, including English language translation of the Office Action.

*Applied Cryptography*, First Edition, 1994, pp. 10–13.

* cited by examiner

| | DIFFERENT TYPES OF ALGORITHMS | | | | |
|---|---|---|---|---|---|
| | | A1 | A2 | ··· ··· | An |
| DIFFERENT TYPES OF ALGORITHMS | A1 | A11 | A12 | | A1n |
| | A2 | A21 | A22 | | A2n |
| | ⋮ | | | | |
| | An | An1 | An2 | | Ann |

SOFTWARE ENCODING USING A COMBINATION OF TWO TYPES OF ENCODING AND ENCODING TYPE IDENTIFICATION INFORMATION

BACKGROUND OF THE INVENTION

The present invention relates to techniques for the encoding of data including character, voice, animation, still image, program, or other data, and to techniques for the decoding of these kinds of encoded data.

For software distribution, a method of encrypting character, voice, animation, still image, program or other data and storing this data on floppy disks, CD-ROMs, magneto-optical disks (MO), or other media, and selling these media, may be employed, or a method of encoding the data and delivering the data to users through a communications circuit, as well as other methods, may be employed.

In previous encoding methods of this kind, the provider has, for example, encoded a program with a single algorithm and provided it to the user, and the user has performed the decoding operation using a so-called "key" also provided to the user.

However, when the key possessed by the user is obtained by a wrongful user, there is a fear that a copy will be created based on the results of a decoding using the wrongfully obtained key. If a large amount of these copies are circulated, the provider will be forced to incur a substantial loss.

The present invention has been created bearing this problem in mind, by noting that many types of software have a special characteristic of under going an upgrade after only a brief period of time. The present invention provides an encoding combination method whereby the encoding algorithm may be changed periodically or for each software upgrade.

SUMMARY OF THE INVENTION

The present invention employs two or more basic encoding algorithms for encoding software. Conversely, for software decoding processing (the software encoding apparatus), basic decoding algorithms are prepared that correspond to these two or more encoding algorithms. Then, the software encoding apparatus transfers, along with the encoded software combination identification information identifying the encoded algorithms used for encoding to the software decoding means (the software decoding apparatus).

The above-mentioned basic encoding algorithm performs at a minimum the processing necessary to convert input data into random like data. For example, convert input data into rearranged data or replaced data. In addition, exclusive-OR of the input data and other random data can be output.

Based on the previously mentioned algorithm combination identification information, the software decoding means selects basic decoding algorithms from among those that it possesses, and decodes the previously mentioned encoded software.

Within the previously mentioned means, when the software is input into the software encoding apparatus, it is encoded with a selected basic algorithm combination (for example, A1 and A3). Software that has been encoded in this way is distributed to the user in the form of a CD-ROM or via a communications circuit. The user decodes this encoded software with a decoding apparatus that he or she possesses. At this time, the user decodes the relevant encoded software based on or responsive to the encoding combination identification information (for example, A1¦ ¦A3) used by the encoding apparatus. This combination information may be delivered to the user on the same medium as the encoded software, or on a different medium, or it may be communicated to the user along with non-illustrated key information (K).

Moreover, the combination identification information may be encoded by using an algorithm.

Each of the individual algorithms are relatively easy to analyze. However, the combining of these algorithms increases the difficulty of analysis. Therefore, even though each individual algorithm may easily be grasped on its own or separately, since there is an enormous amount of possible algorithm combinations, it would require significant time and effort to analyze a combination of algorithms, making such an analysis difficult in reality. Even if there were to be a possibility of such an analysis occurring, if for every software upgrade, the software is encoded with a new combination of algorithms, the most recent software upgrade cycle will be sufficient to cover for such a possibility.

In fact, if hackers should attempt to decode the combinations of the encoded algorithms has such a large number they will likely abandon the attempt.

DESCRIPTION OF THE PREFERRED EMBODIMENT

Prior to an explanation of a preferred embodiment of the present invention, the basic theory behind the present invention will be explained.

Figure 1:
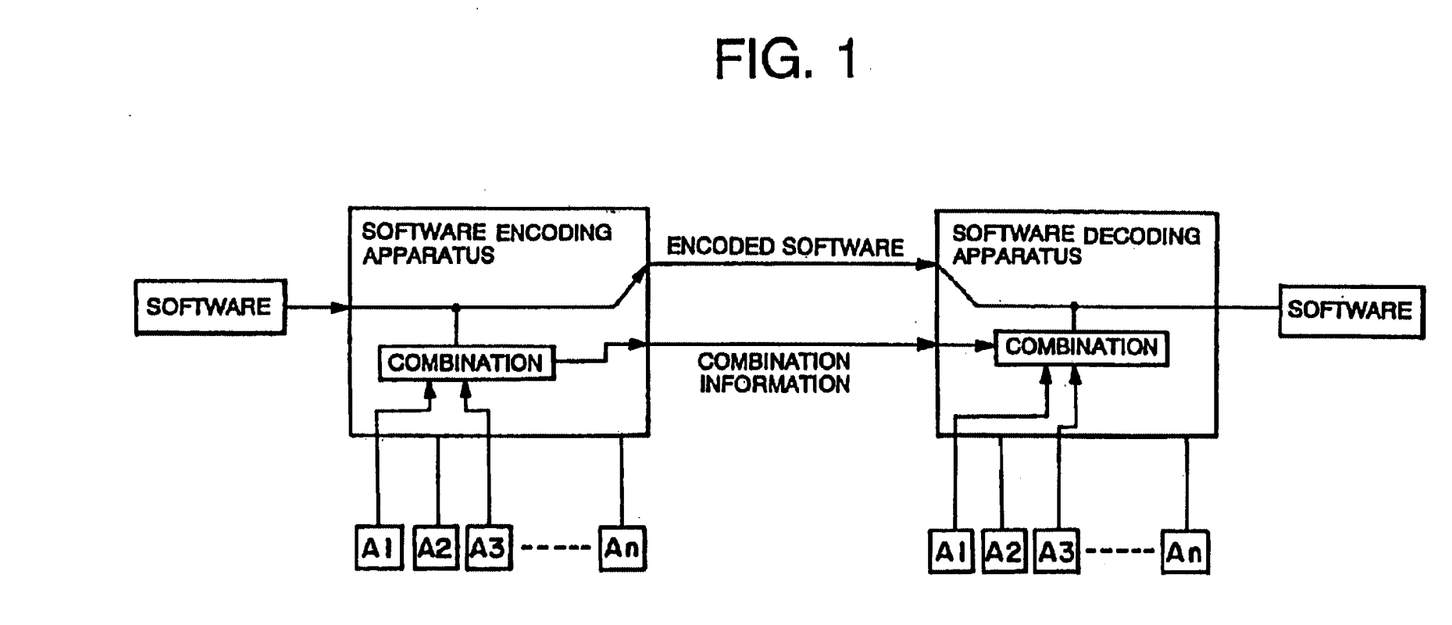
FIG. 1 is a theoretical diagram of the present invention.

As shown in FIG. 1, in the present invention, when software is to be encoded, two or more basic encoding algorithms are employed. Conversely, for software decoding processing (the software encoding apparatus), basic decoding algorithms are prepared that correspond to these two or more basic encoding algorithms. Furthermore, the software encoding apparatus transfers, along with the encoded software, combination information identifying the basic encoded algorithms used for the encoding to the software decoding means (the software decoding apparatus).

Based on the previously mentioned basic algorithm combination information, the software decoding means selects from among basic decoding algorithms that it possesses, and decodes the previously mentioned encoded software.

In this way, when the software is input into the software encoding apparatus, it is encoded with a selected basic algorithm combination (for example, A1 and A3). Software that has been encoded in this way is distributed to the user in the form of a CD-ROM or via a communications circuit. The user decodes this encoded software with a decoding apparatus that he or she possesses. At this time, the user decodes the relevant encoded software based on the encoding combination identification information (for example, A1¦ ¦A3) used by the encoding apparatus. This combination information may be delivered to the user on the same medium as the encoded software, or on a different medium, or it may be communicated to the user along with non-illustrated key information (K).

Figure 2:
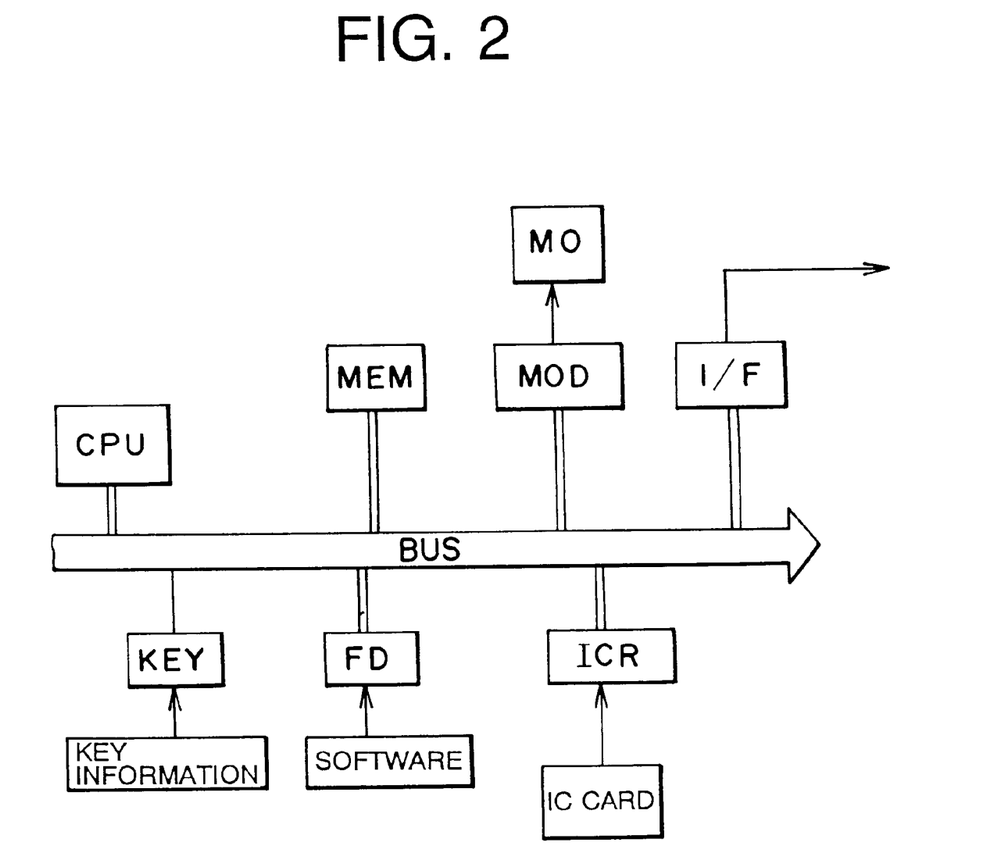
FIG. 2 is a configuration diagram of the hardware of a preferred embodiment of the present invention.
Figure 13:
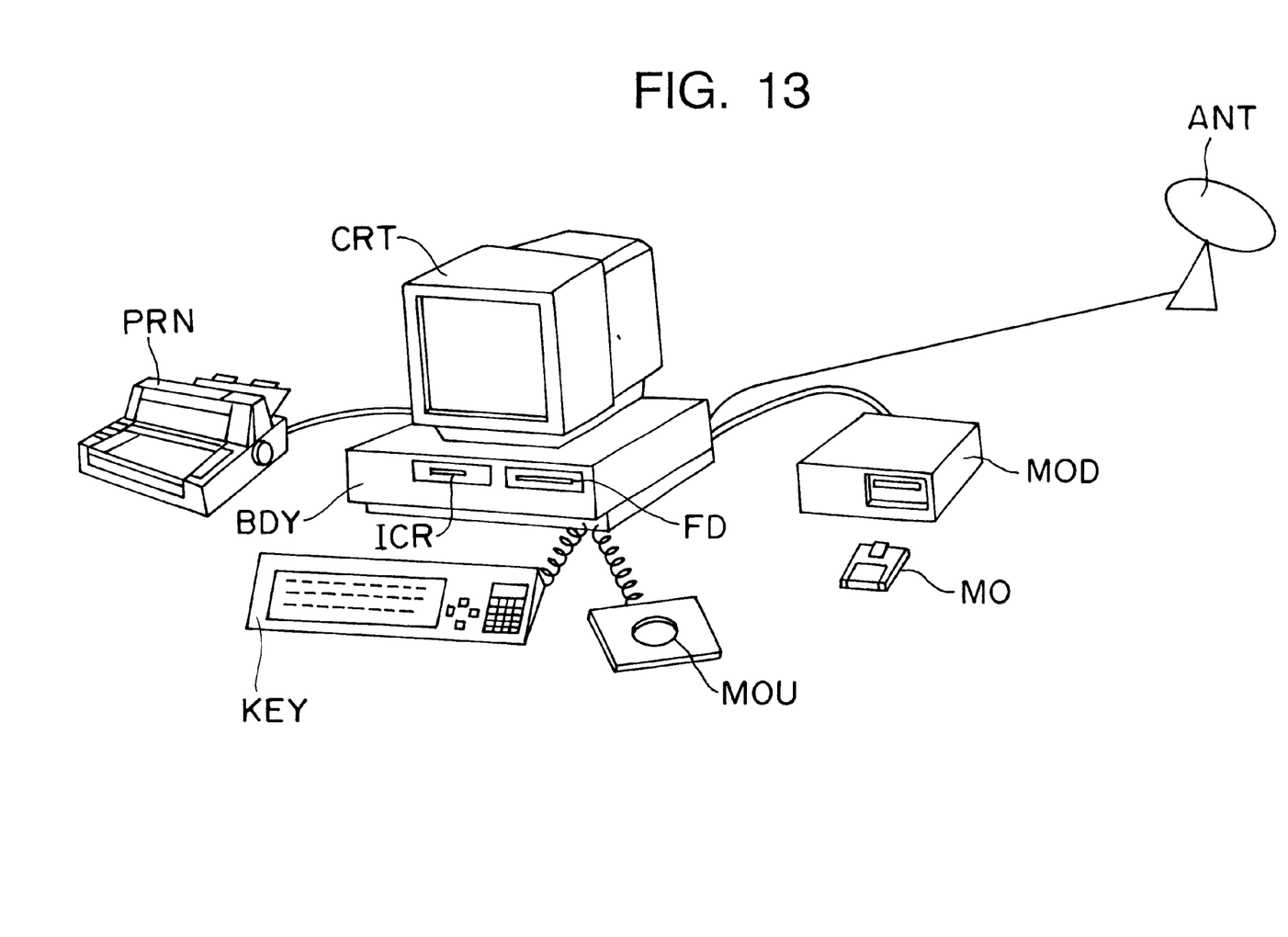
FIG. 13 is an explanatory diagram showing the hardware configuration of this invention.

FIG. 2 and FIG. 13 show the hardware configuration of the software encoding apparatus that is a preferred embodiment of the present invention.

An IC card slot (ICR), a floppy disc drive (FD) and a hard disk drive (not shown in figures) are installed in a main body of the computer (BDY).

A modem (MDM) and a receiver (not shown in figures) can be built into the main body of the computer (BDY) and data maybe transmitted or received through cable or the wireless route through the ANT.

A keyboard (KEY) and a mouse (MOU) are connected with the main body of the computer (BDY) as input devices.

A display (CRT) and a printer (PRN) are connected with the main body of a computer (BDY) as output devices.

An optical disk drive (MOD) is connected with the main body of the computer (BDY) as an external storage device.

Within the diagram, BUS is the bus, indicating both the control bus and the data bus. CPU is the central processing unit, and a 32-bit or a 64-bit processor is used. MEM is the memory, which stores the encoding combination table, to be described below, and an address specified by the operation domain. KEY is the keyboard, which is used to perform the input of commands into this apparatus, and to input key information (K). FD is the floppy disk apparatus, which reads out the software for performing encoding processing.

Although only a floppy disk is shown as the software provision means, such means is not limited to this alone: a magneto-optical disk or a communications circuit may also be used. Moreover, the memory MEM or a buffer within the central processing unit CPU may also function as the software provision means.

ICR is the IC card reader, and it is possible to equip the system with a PCMCIA card that conforms to the JEIDA (Japan Electronic Industry Development Association) standard. In the present preferred embodiment, the algorithms A1, A2, A3 . . . An to be discussed below are provided by being stored on the IC card. It is desirable to provide physical protection for this IC card; for example, the data thereon may be completely erased by a wrongful access of the card by a user, or card read-out may be prevented. Furthermore, the configuration of the multiple algorithms on this card may be changed following a prescribed fixed period. If the arrangement or contents of the algorithms stored in this card are renewed periodically, the decoding of the software may be limited to a certain period of time, enabling it to be used as demonstration software, or as specific-system software for limited uses.

MOD is the magneto-optical disk apparatus, which is able to read from and write onto a magneto-optical disk with a capacity of 100 megabytes or more. Also, IF is the communication interface, which is connected to an external communications circuit.

Besides the above apparatus configuration, a CD-ROM sampling apparatus, for example, may also be connected.

Although the above is an explanation of the software encoding apparatus of FIG. 2, the software decoding apparatus has the same configuration. However, when this apparatus is used as the software decoding apparatus, a CD-ROM drive may also be provided. In other words, as a medium for distributing voice, still image, animation, and other large amounts of data, the CD-ROM is appropriate.

Figure 3:
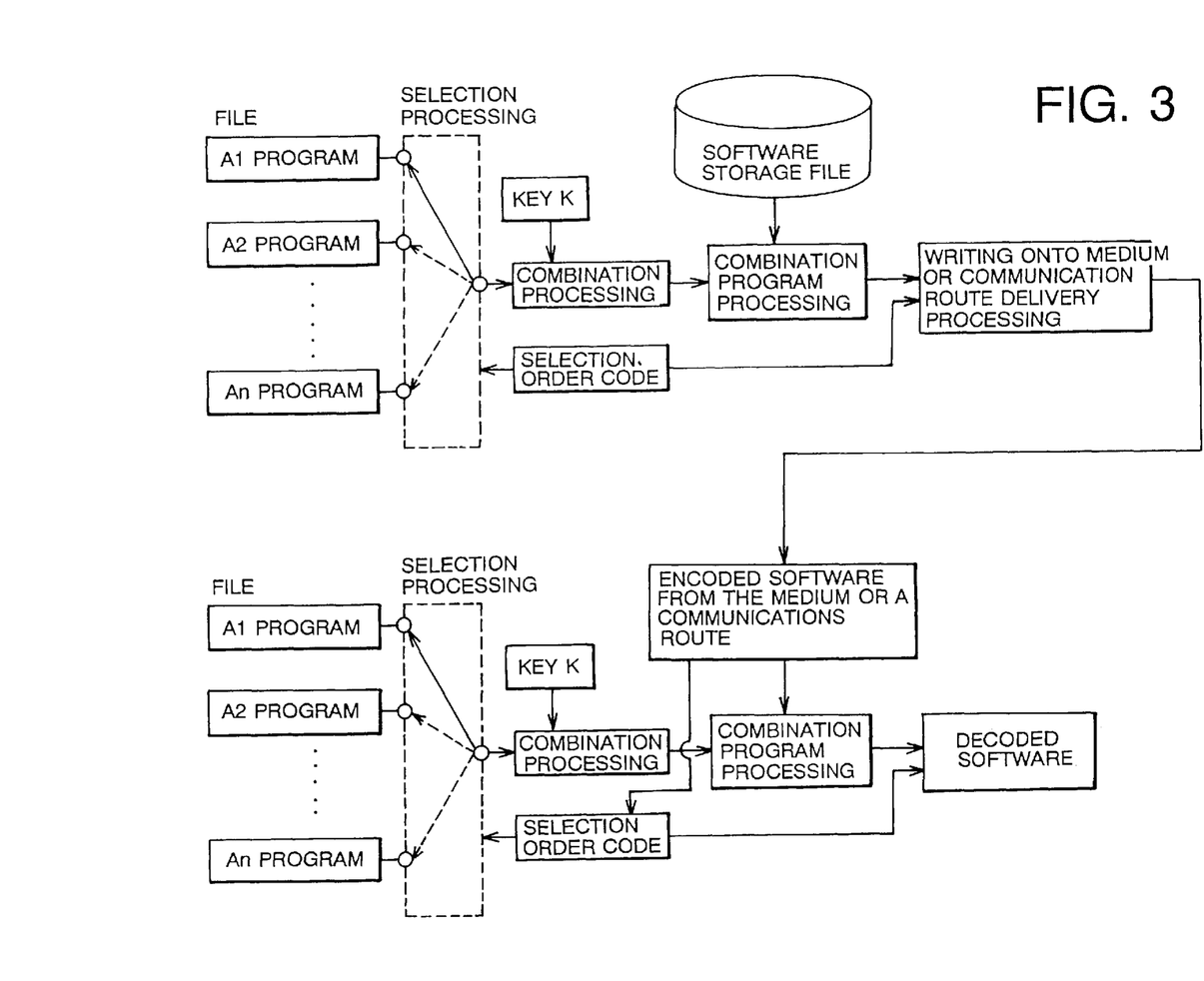
FIG. 3 is a functional block diagram of the system configuration of a preferred embodiment of the present invention.

FIG. 3 shows a functional block diagram of the system configuration of the present preferred embodiment. Within the diagram, the upper tier shows the functions of the software encoding apparatus, while the lower tier shows the functions of the software decoding apparatus.

To explain the relationship between the functions shown in FIG. 3 and the hardware explained with FIG. 2, the algorithm programs (A1, A2 . . . An) shown in FIG. 3 is provided by being stored on the IC card. Also, selection processing, combination processing, and combination program processing are functions realized by using the central processing unit (CPU). Key information (K) is input using the keyboard (KEY). Also, the software storage file is input via the floppy disk apparatus (FD) or the magneto-optical disk apparatus (MOD), and is written into the memory (MEM).

Next, FIG. 3 will be used to explain the software encoding processing.

First, the basic algorithms to be used for software encoding processing are determined through selection processing by the central processing unit (CPU). Here, processing is performed whereby two or more encoding algorithm programs are selected. The selection of algorithms may be performed, for example, using algorithm tables, such as those shown in FIG. 4, which have been established within the memory (MEM).

Figure 4:
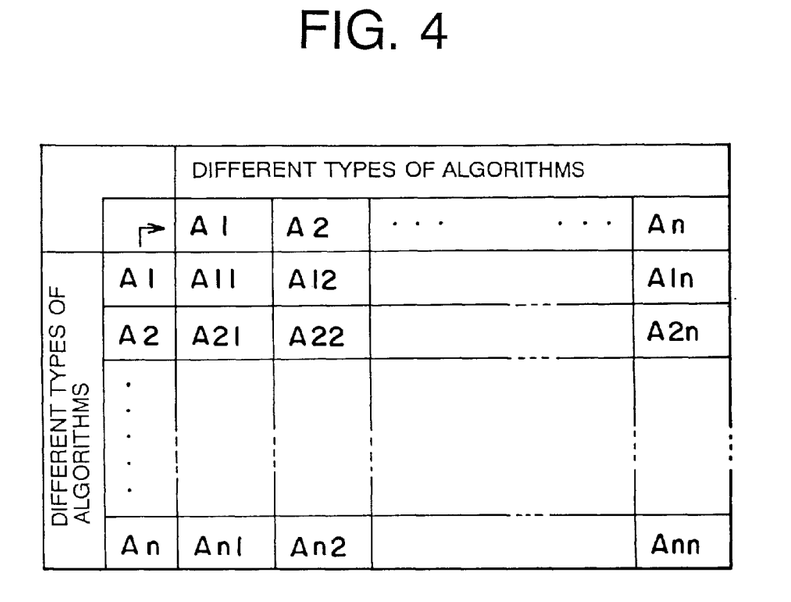
FIG. 4 is an explanatory diagram showing an algorithm table of a preferred embodiment of the present invention.

As shown in the same diagram, n number (A1, A2 . . . An) of algorithms are provided in a matrix form within the algorithm table. In this way, when n number of basic elements (algorithms) are used to form separate combinations of two algorithms, when overlapping is permitted, $n^2$ algorithm combinations can be formed.

Conversely, in a case where any desired number n of basic elements (algorithms) are combined in tandem, and when different combinations are performed for each element (algorithm), a maximum of n! algorithm combinations may be obtained. Furthermore, when overlapping combinations (exchanges) are permitted, a maximum $n^n$ algorithm combinations may be formed.

For example, algorithms A1 and A2 may be combined to form A1¦ ¦A2, or a combination of three algorithms may be performed to form, for example, A1¦¦A2¦¦A3. Also, the same algorithm may be combined in L steps, such as A1¦¦A1¦¦ . . . ¦¦A1.

In this way, with the present preferred embodiment, since a multiple number of algorithm combinations may be formed, even if, for example, individual basic algorithms are easily analyzable on their own, by combining these basic algorithms together, an algorithm that is difficult to analyze may be obtained.

Figure 5:
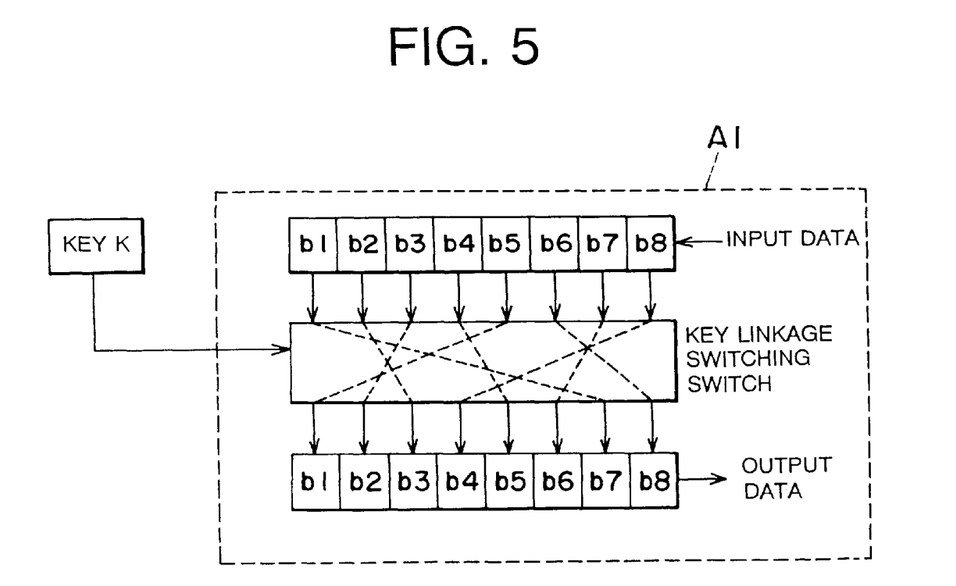
FIG. 5 is an explanatory diagram showing a concrete example of a transposition type algorithm.

Next, a concrete algorithm example will be explained. FIG. 5 shows a concrete example of a transposition type basic algorithm. In other words, with this algorithm, a key linkage switching switch is provide as a program, and for every 8 bits of data, bit locations are transposed and then output. Key information (K) provided from an external source controls the transposition locations. Moreover, although input/output is shown as an 8-bit configuration in the diagram, the invention is not limited to such a configuration. This kind of transposition type algorithm may, for example, be registered or stored as "A1" in the algorithm table described previously.

Figure 6:
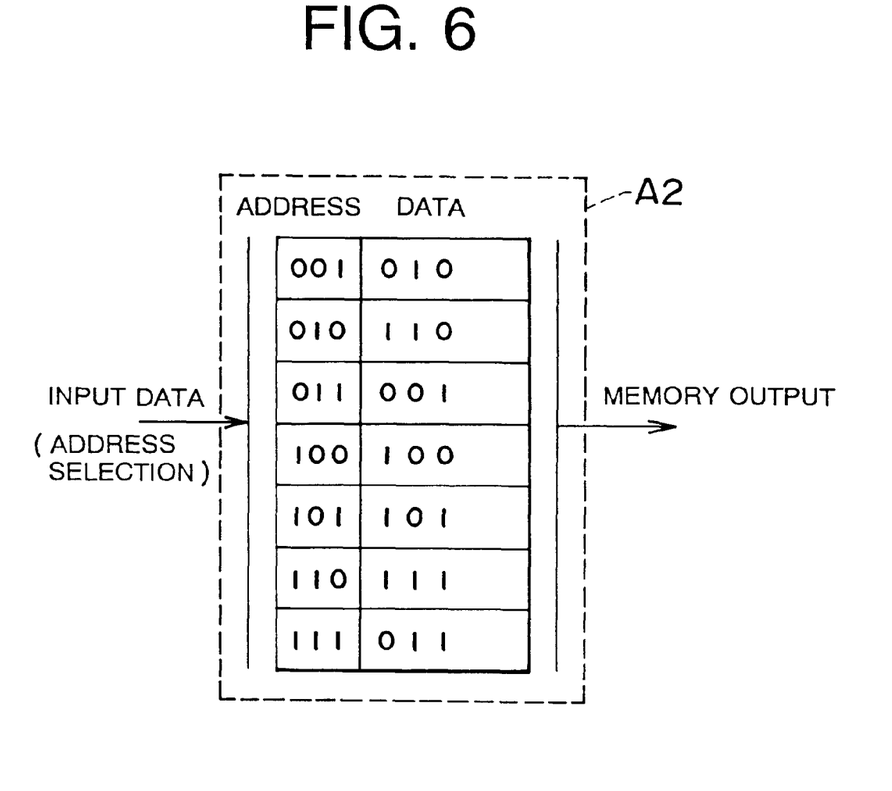
FIG. 6 is an explanatory diagram showing a concrete example of a character conversion type algorithm.

FIG. 6 shows a concrete example of a character conversion type basic algorithm. With this algorithm, output data corresponding to input data is placed in a table and saved. Moreover, although input/output is shown as a 3-bit configuration in the diagram, naturally, the invention is not limited to such a configuration. This kind of character conversion type algorithm may, for example, be registered or stored as "A2" in the algorithm table described previously.

Figure 7:
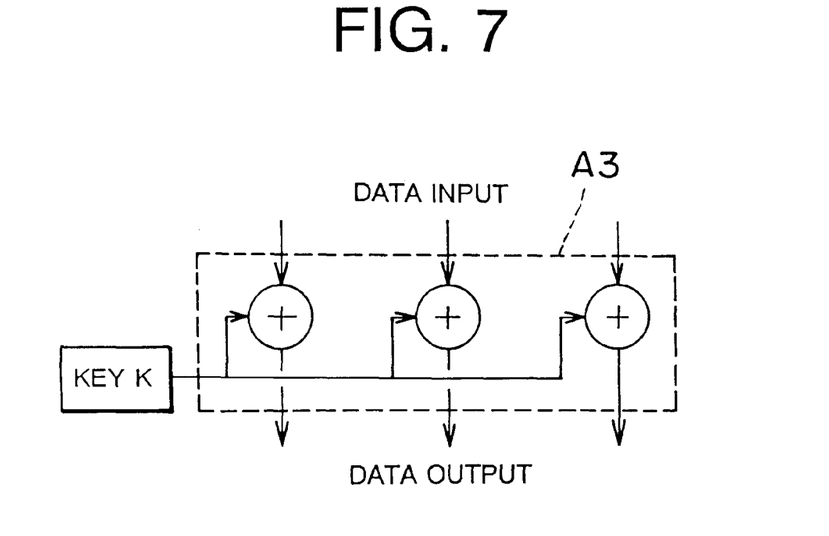
FIG. 7 is an explanatory diagram showing a concrete example of an exclusive-or algorithm.

FIG. 7 shows a concrete example of an exclusive-or algorithm. With this algorithm for example, key information (K) may be used to control exclusive-or logic processing on each bit. Moreover, although input/output is shown in a 3-bit configuration in the diagram, naturally, the number of bits is not limited to three. This kind of exclusive-or algorithm may, for example, be listed as "A3" in the algorithm table described previously.

Figure 8:
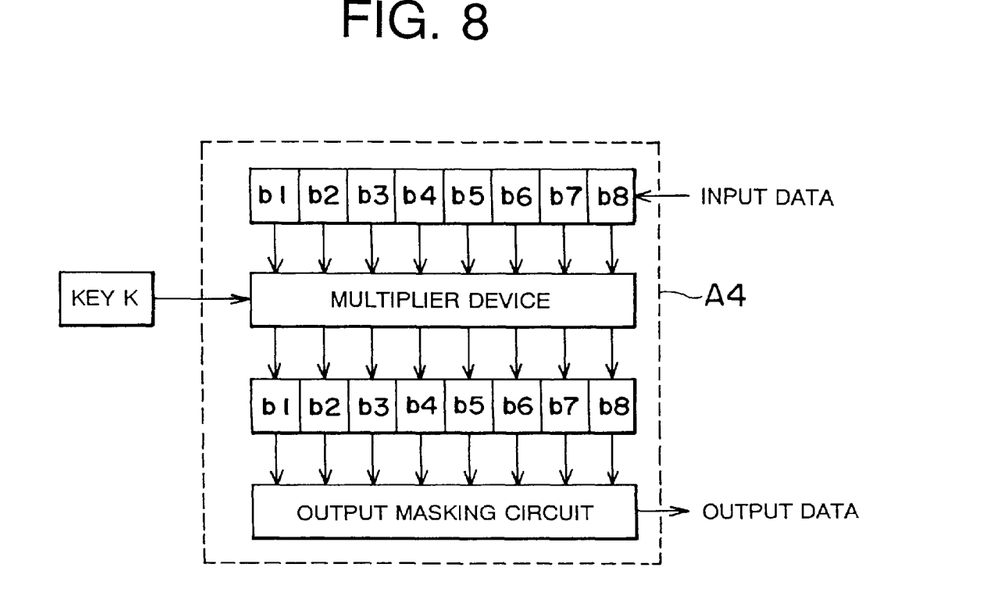
FIG. 8 is an explanatory diagram showing a concrete example of a multiplication type algorithm.

FIG. 8 shows a concrete example of a multiplication type algorithm. In this diagram, when 8-bit data is input, after this input data is multiplied with the multiplier device using the key information (K), data that has been masked with the output masking circuit is output. This kind of multiplication type algorithm may, for example, be registered as "A4" in the algorithm table described previously.

Figure 9:
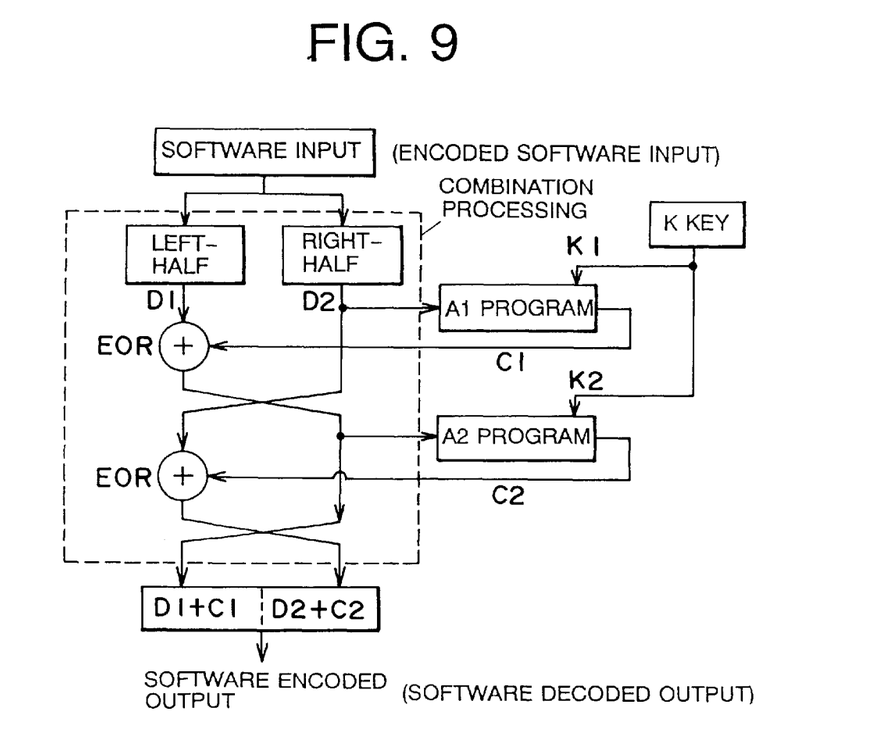
FIG. 9 is an explanatory diagram showing a concrete example of DES type combination processing.
Figure 10:
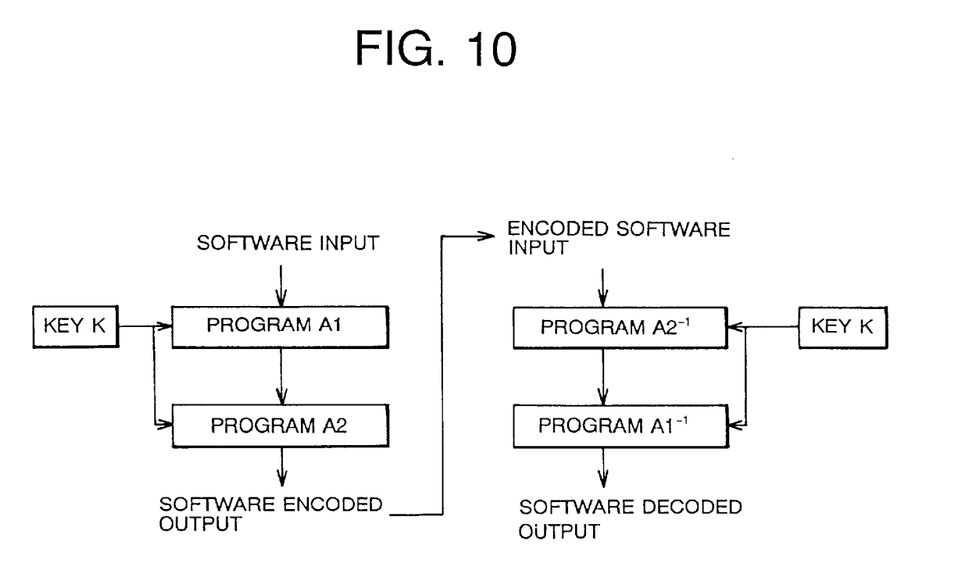
FIG. 10 is an explanatory diagram showing a concrete example of an ENIGMA combination.

After algorithms from the multiple algorithms, such as those described above, are selected by the "selection processing" of the central processing unit (CPU), combination processing (encoding execution means) is performed. FIG. 9 and FIG. 10 show concrete examples of this combination processing.

FIG. 9 shows an example of a DES type combination.

Within the diagram, when software data is input, it is divided into groups of a prescribed number of bits (for example, after every 8 bits), and processing is performed on these groups. Here, the said 8-bit data is divided into left-half data (D1) which comprises the 4 high-order bits, and right-half data (D2) which comprises the 4 low-order bits.

Then, the right-half data (D2) is processed with the A1 algorithm, and is output as encoded data C1.

The left-half data (D1) undergoes exclusive-or logic processing along with the previously mentioned encoded data (C1), and is output as encoded data (D1+C1).

Conversely, the exclusive-or logic processing of output data that includes the left-half data (D1) and the A1 algorithm output data (C1) is processed with the A2 algorithm, and is output as encoded data C2. This encoded data C2 undergoes exclusive logic processing along with the right-half data (d2), and is output as encoded data (D2+C2).

Although the decoding processing for FIG. 9 is not shown in a diagram, it is sufficient to prepare a system whereby an A1 decoding algorithm replaces the A1 program, and an A2 decoding algorithm replaces the A2 program shown in FIG. 9.

FIG. 10 shows an example of an ENIGMA combination. In this example, after input software is primarily changed with the A1 algorithm, it undergoes a secondary change with the A2 program.

Also, as shown in the left half of the diagram, in the case where this is to be decoded, it is first primarily decoded with the decode algorithm $A2^{-1}$ of algorithm A2. By then performing a secondary decoding with the decode algorithm $A1^{-1}$ of algorithm A1, the software can be returned to its original form.

Figure 11:
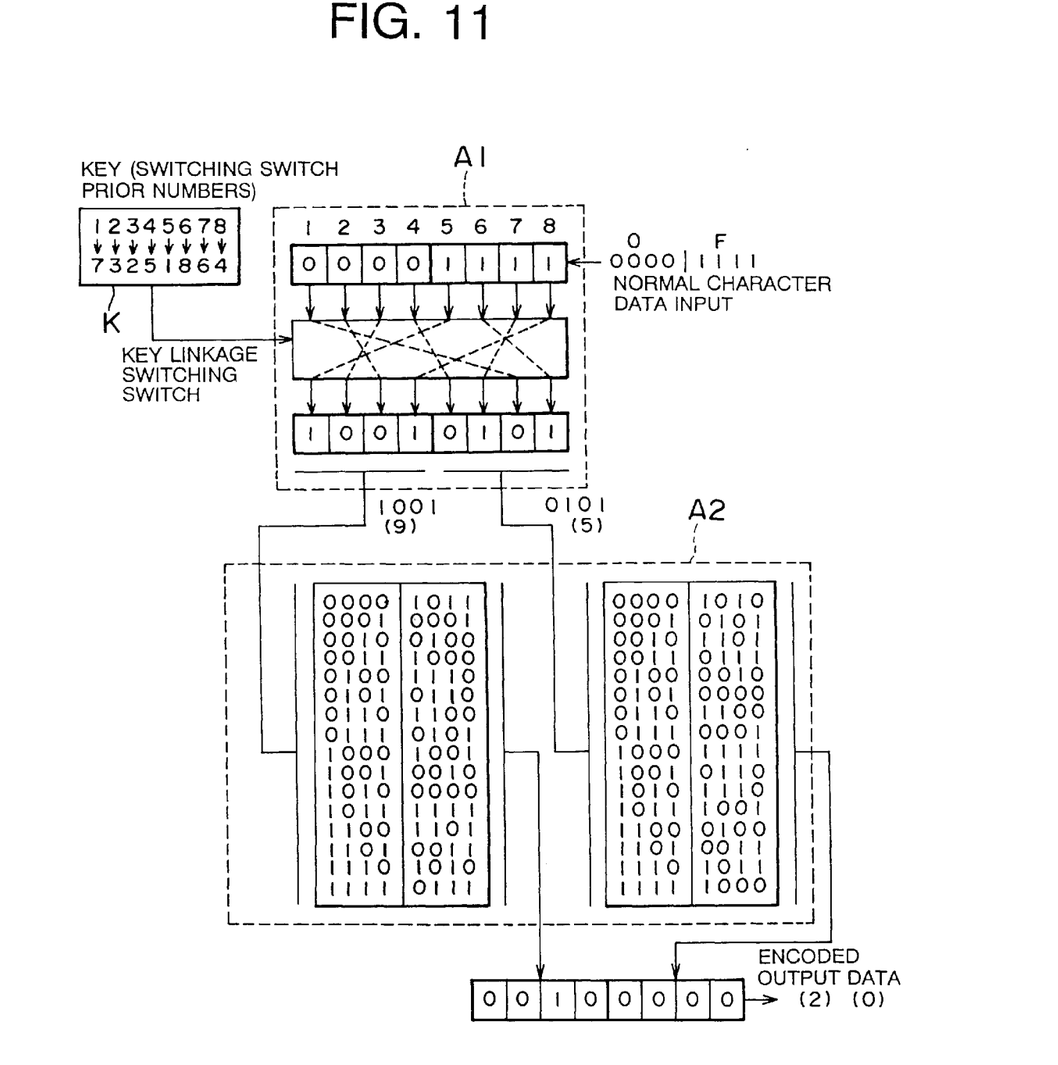
FIG. 11 is an explanatory diagram showing a concrete example of a case where a transposition type algorithm (A1) is combined with a character conversion type algorithm (A3) for the performing of ENIGMA type combination processing.

Next, by using FIG. 11, an even more concrete preferred embodiment of an algorithm is explained. In this case, a transposition type algorithm (A1) is combined with a character conversion type algorithm (A2), and ENIGMA type combination processing is performed.

First, key information (K) is provided to the key linkage switching switch. This key information (K) is information that prescribes how each bit of input 8-bit data will be transposed for output. In the diagram, the following key information (K) settings are provided to the key linkage switching switch: #1 bit→#7 bit, #2 bit→#3 bit, #3 bit→#2 bit, #4 bit→#5 bit, #5 bit→#1 bit, #6 bit→#8 bit, #7 bit→#6 bit, #8 bit→#4 bit.

Here, when software data (ordinary character data) "0Fh"—in other words, "00001111"—is provided, with the key linkage switching switch as prescribed with the previously described key information (K), the following transpositions occur: the #1 bit "0" becomes the #7 bit, the #2 bit "0" becomes the #3 bit, the #3 bit "0" becomes the #2 bit, the #4 bit "0" becomes the #5 bit, the #5 bit "1" becomes the #1 bit, the #6 bit "1" becomes the #8 bit, the #7 bit "1" becomes the #6 bit, and the #8 bit "1" becomes the #4 bit. As a result, the switching result with algorithm A1 is "10010101", in other words, "95h".

Next, the primary encoded data "95h" that has been encoded with algorithm A1 then undergoes secondary encoding with the character conversion algorithm A2.

Here, the input data (95h) is first divided into left-half data, which comprises the 4 high-order bits, and right-half data, which comprises the 4 low-order bits. Then, conversion is performed based on each conversion table. As a result, the secondary encoded output data becomes "00100000", in other words, "20h".

Next, as shown in FIG. 3, the above selection processing, combination processing, and combination program processing is performed, and encoded software is created. This encoded software is then saved on a medium such as an MO, a CD-ROM, or a floppy disk, etc., and is sent (delivered) to the user by the provider. Also, it may be transmitted to the user through an interface (I/O) via a communications circuit. Also, at this time, the algorithm selection order code (identification information)—for example, the previously mentioned code "A1¦¦A2"—is stored on the MO, the CD-ROM, the floppy disk, etc., that is the medium along with the encoded software. Also, in the case of communication transmission, this code may also be sent with the encoded software along the communications route.

Furthermore, this selection order code may be communicated from the provider to the user along a separate delivery route than the previously mentioned encoded software; for example, it may be explained verbally over the telephone, etc. Moreover, the selection order code may be provided to the user together with the key information (K).

After the user has received the previously mentioned encoded software and selection order code, with the decoding apparatus on the user side, based on the previously mentioned selection order code information, decoding algorithms are selected, combination processing and combination program processing is performed, and decoded software is obtained.

Figure 12:
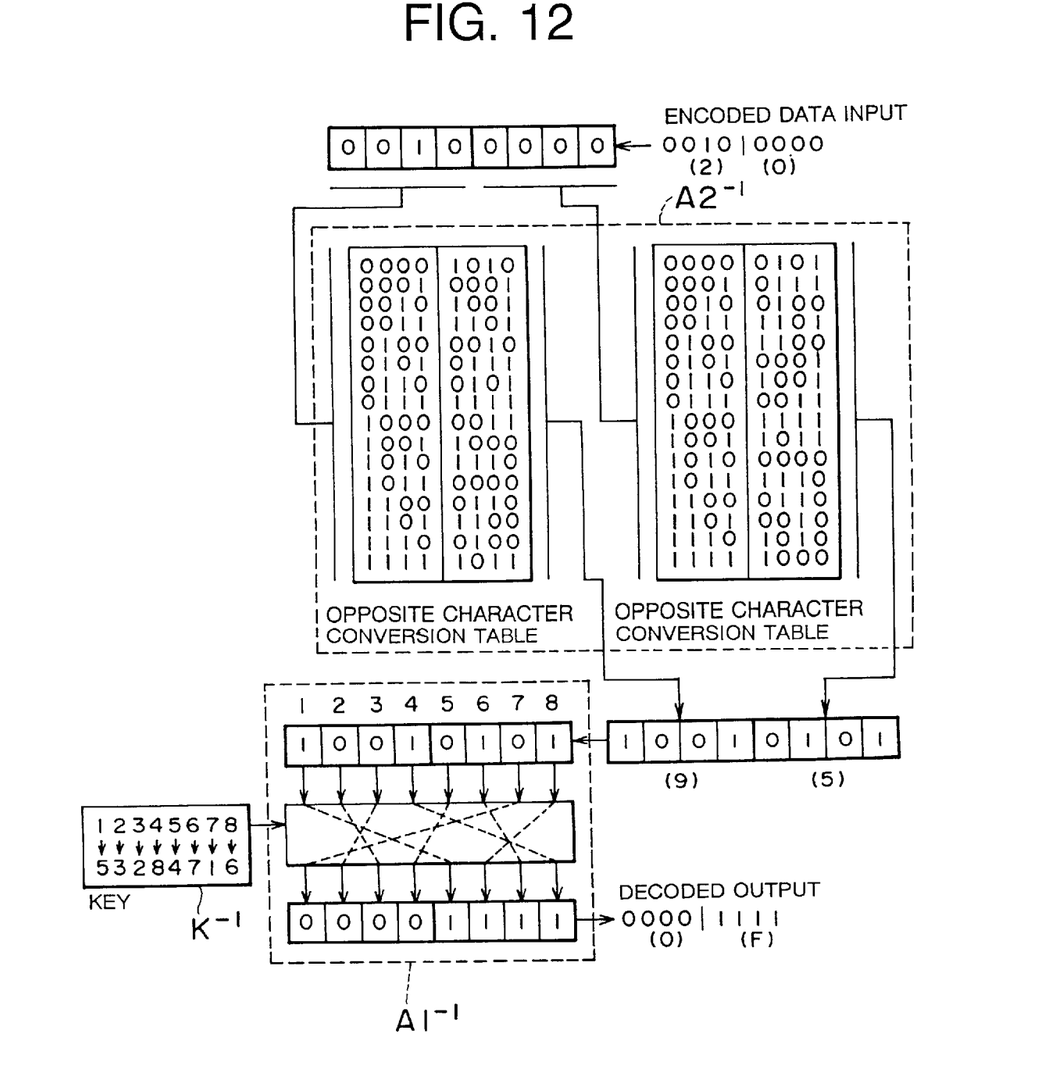
FIG. 12 is an explanatory diagram showing a concrete example of a case where encoded software that has been encoded with the combination processing of FIG. 11 is decoded.

FIG. 12 shows a concrete example of this decoding processing.

Within the diagram, for every 8 bits (20h) of encoded data from the encoded software, after dividing the 4 high-order bits into left half data, and the 4 low-order bits into the right half data, first character conversion is executed on these with algorithm $A2^{-1}$. The primary encoded data (95h) obtained with this character conversion further undergoes transposition conversion with the transposition type basic algorithm $A1^{-1}$, and decode data "00001111"—in other words, "0Fh"—is obtained.

What is claimed is:

1. A software/data transmitting and receiving method comprising:
    arbitrary selecting at least two basic encoding algorithms from a predetermined plurality of basic encoding algorithms;
    generating a new encoding algorithm based on at least said selected two basic encoding algorithms;
    encoding software/data from a software/data provider with the new encoding algorithm;
    transmitting the encoded software/data and a combination information identifying a combination arrangement of said at least two basic encoding algorithms used for encoding the software/data to a software/data receiver;
    receiving in a software/data receiver the encoded software/data and the combination information;
    selecting at least two basic decoding algorithms and a combination arrangement of the basic decoding algorithms in accordance with said combination information received by said software/data receiver;
    generating a new decoding algorithm, based on the selected basic decoding algorithms and the combination information; and
    decoding the software/data with the new decoding algorithm.

2. The software/data transmitting and receiving method according to claim 1, wherein the new encoding algorithm is generated by combining the at least two encoding algorithms together with key information.

3. A software/data transmitting and receiving method, comprising:
    a first setting process of arbitrarily setting at least two basic encoding algorithms from a predetermined plurality of basic encoding algorithms in a transmitting system;
    a software/data encoding process of encoding a software/data by combining said basic encoding algorithms set by the first setting process in said transmitting system;
    a outputting process of outputting the encoded software/data and a combination information concerned with a combination arrangement of the basic encoding algorithms from said transmitting system;
    a receiving process of receiving encoded software/data and a combination information concerned with a combination arrangement of the basic encoding algorithms in said receiving system;
    a deciding process of deciding on at least two basic decoding algorithms and a combination arrangement of the basic decoding algorithms in accordance with the combination information received by said receiving process;
    a second setting process of decoding the encoded software/data in accordance with the basic decoding algorithms and the combination arrangement decided by the deciding process in said receiving system.

4. A software/data transmitting method, comprising:
    encoding the software/data by arbitrarily selecting and generating a new encoding algorithm by combining at least two basic encoding algorithms from a predetermined plurality of basic encoding algorithms in a transmitting system;
    transmitting the encoded software/data from said transmitting system; and
    transmitting a combination information identifying a combination arrangement of the basic encoding algorithms from said transmitting system.

5. A software/data receiving method, comprising:
    a first receiving process of receiving encoded software/data in a receiving system;
    a second receiving process of receiving a combination information concerned with a combination arrangement of at least two basic encoding algorithms in said receiving system;
    a deciding process of deciding at least two basic decoding algorithms and a combination arrangement of the basic decoding algorithms in accordance with the combination information received by said first and second receiving process; and
    a software/data decoding process of decoding the encoded software/data in accordance with the basic decoding algorithms and the combination arrangement decided by the deciding process in said receiving system.

6. A computer readable storage storing at least one program controlling a software/data transmitting system according to a process comprising:
    providing software/data;
    arbitrarily setting at least two basic encoding algorithms from a predetermined plurality of basic encoding algorithms;
    generating a new encoding algorithm based on at least the set basic encoding algorithms;
    encoding the provided software/data with the generated new encoding algorithm; and
    outputting the encoded software/data and a combination information concerned with a combination arrangement of said set at least two basic encoding algorithms used for encoding the software/data.

7. The computer readable storage according to claim 6, wherein the encoding comprises dividing the software/data into bit groups of a predetermined number, each bit group having specified number of bits, performing encoding processing in a parallel fashion for each of said bit group of bits with said at least two basic encoding algorithms, and combining said bit groups that have been divided.

8. The computer readable storage according to claim 6, wherein the encoding comprises dividing the software/data into bit groups of a predetermined number each bit group having specified number of bits, performing encoding processing for each of said bit group serially with said at least two basic encoding algorithms, and combining said bit groups that have been divided.

9. The computer readable storage according to claim 6, the control process further comprising:

recording how said encoding algorithm generation combines the set basic algorithms, wherein the outputting comprises outputting the encoded software/data and the combination information concerned with a combination arrangement including said algorithm generation record.

10. The computer readable storage according to claim 6, wherein the encoding comprises:

dividing the software/data into first and second groups of a prescribed number of bits;

processing the second group of the prescribed number of bits and outputting a first encoded software/data;

applying exclusive-or logic processing of the first group of the prescribed number of bits along with the first encoded software/data and outputting a first combined software/data;

processing the first combined software/data and outputting a second encoded data;

applying exclusive-or logic processing of the second group of the prescribed number of bits along with the second encoded software/data and outputting a second combined software/data; and providing key information into said processing of the second group and the first combined software/data.

11. The computer readable storage according to claim 6, wherein the encoding comprises:

providing a key which is information that prescribes how each bit of the software/data will be transposed for output;

encoding the software/data using the key and outputting a primary encoded software/data;

converting said primary encoded software/data by dividing the primary encoded software/data into a plurality of first and second primary encoded software/data, and using a conversion table corresponding to the divided primary encoded software/data to encoded the software/data; and outputting the encoded software/data and outputting encoding identification information identifying the key and the character conversion.

12. A computer readable storage storing at least one computer program controlling a software/data receiving system according to a process comprising:

receiving encoded software/data and a combination information concerned with a combination arrangement of at least two basic encoding algorithms used for encoding the software/data;

providing a plurality of basic decoding algorithms;

selecting at least two basic decoding algorithms that are necessary for decoding of said software/data from among the provided plurality of decoding algorithms, based on the provided combination arrangement; and decoding said encoded software/data according to the selected basic decoding algorithms and the combination arrangement of the basic decoding algorithms.

13. The computer readable storage of claim 12, wherein the providing of the basic decoding algorithms comprises maintaining an executable program having said at least two basic decoding algorithms within a recording medium that is physically protected from external access.

14. A computer readable storage storing at least one program controlling a software/data transmitting system according to a process comprising:

providing software/data;

providing a plurality of basic encoding algorithms;

selecting at least two basic algorithms from the provided plurality of basic encoding algorithms;

generating a new encoding algorithm based on at least the selected two basic encoding algorithms;

encoding the provided software/data with the generated new encoding algorithm; and outputting the encoded software/data and a combination information concerned with a combination arrangement of said selected basic encoding algorithms.

15. A computer readable storage storing at least one program controlling a software/data receiving system according to a process comprising:

receiving encoded software/data and a combination information concerned with a combination arrangement of at least two arbitrarily selected basic encoding algorithms;

deciding on at least two basic decoding algorithms and a combination arrangement of said basic decoding algorithms according to the received combination information;

generating a new decoding algorithm, based on the decided basic decoding algorithms and the combination arrangement; and decoding the received software/data with the generated new decoding algorithm.

16. The computer readable storage of claim 15, wherein the decoding comprises:

converting said encoded software/data by dividing the encoded software/data into a plurality of first and second encoded software/data end using a conversion table corresponding to the first and second software/data to output a decoded first and second software/data;

combining said first and second decoded software/data;

providing a key prescribing how each bit of the combined first and second decoded software/data will be transposed for output;

decoding the combined first and second decoded software/data by using the provided key; and outputting a decoded software/data.

17. A computer readable storage storing at least one program controlling a software/data transmitting and receiving system according to a process comprising:

setting at least two basic encoding algorithms from a predetermined plurality of basic encoding algorithms;

encoding the software/data with a new encoding algorithm by a combination arrangement of the set basic encoding algorithms;

outputting the encoded software/data and combination information concerned with the combination arrangement of the basic encoding algorithms;

receiving the encoded software/data and the combination information concerned with the combination arrangement of the basic encoding algorithms;

deciding on at least two basic decoding algorithms and a combination arrangement of the basic decoding algorithms according to the received combination information;

setting the decided basic decoding algorithms; and decoding the encoded software/data according to the set basic decoding algorithms and the decided combination arrangement.

18. A computer system transmitting software/data, comprising:

a programmed computer processor providing software/data, arbitrarily setting at least two basic encoding algorithms from a predetermined plurality of basic encoding algorithms, generating a new encoding algorithm based on at least the set basic encoding algorithms, encoding the provided software/data with the generated new encoding algorithm, and outputting the encoded software/data and a combination information concerned with a combination arrangement of said set at least two basic encoding algorithms used for encoding the software/data.

19. The computer system of claim 18, further comprising a recording medium physically protected from external access and storing an executable program having said at least two basic decoding algorithms.

20. A computer system receiving software/data, comprising:

a programmed computer processor receiving encoded software/data and a combination information concerned with a combination arrangement of at least two arbitrarily selected basic encoding algorithms, deciding on at least two basic decoding algorithms and a combination arrangement of said basic decoding algorithms according to the received combination information, generating a new decoding algorithm, based on the decided basic decoding algorithms and the combination arrangement, and decoding the received encoded software/data with the generated new decoding algorithm.

* * * * *

UNITED STATES PATENT AND TRADEMARK OFFICE
CERTIFICATE OF CORRECTION

PATENT NO.    : 6,636,970 B2
DATED         : October 21, 2003
INVENTOR(S)   : Ryota Akiyama et al.

It is certified that error appears in the above-identified patent and that said Letters Patent is hereby corrected as shown below:

<u>Column 8,</u>
Line 67, after "number" please insert a comma -- , --.

<u>Column 10,</u>
Line 38, change "end" to -- and --.

Signed and Sealed this

Fifth Day of April, 2005

JON W. DUDAS
*Director of the United States Patent and Trademark Office*